United States Patent
Dolle et al.

(10) Patent No.: US 6,414,096 B1
(45) Date of Patent: Jul. 2, 2002

(54) PROCESS FOR THE PREPARATION OF A POLYOLEFIN

(75) Inventors: Volker Dolle, Kelkheim; Martin Antberg, Hofheim am Taunus; Jürgen Rohrmann; Walter Spaleck, both of Liederbach; Andreas Winter, Kelkheim, all of (DE)

(73) Assignee: Basell Polyolefine GmbH (DE)

( * ) Notice: Subject to any disclaimer, the term of this patent is extended or adjusted under 35 U.S.C. 154(b) by 0 days.

(21) Appl. No.: 08/418,847

(22) Filed: Apr. 7, 1995

Related U.S. Application Data

(63) Continuation of application No. 08/287,104, filed on Aug. 8, 1994, now abandoned, which is a continuation of application No. 07/569,179, filed on Aug. 17, 1990, now abandoned.

(51) Int. Cl.[7] .................................................. C08F 4/44
(52) U.S. Cl. ........................ 526/160; 526/943; 526/352; 526/351; 526/348.6; 526/348.4; 526/348.2; 502/403
(58) Field of Search .......................................... 526/160

(56) References Cited

U.S. PATENT DOCUMENTS

| | | |
|---|---|---|
| 4,769,510 A | 9/1988 | Kaminsky et al. |
| 5,416,178 A * | 5/1995 | Winter et al. ................ 526/160 |

FOREIGN PATENT DOCUMENTS

| | | |
|---|---|---|
| DE | 3726067 | 2/1989 |
| EP | 0185918 | 7/1986 |
| EP | 0 302 424 | 2/1989 |
| EP | 0 318 049 | 5/1989 |

* cited by examiner

*Primary Examiner*—David W. Wu
*Assistant Examiner*—Rip A Lee
(74) *Attorney, Agent, or Firm*—Connolly Bove Lodge & Hutz LLP

(57) ABSTRACT

Olefins of the formula $$R^{11}-CH=CH-R^{12}$$

($R^{11}$, $R^{12}$=H or $C_1$–$C_{14}$-alkyl) are polymerized in the presence of a catalyst consisting of at least one metallocene of the formula I

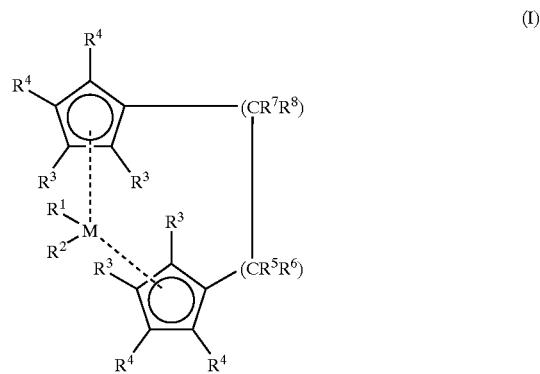

(M=zirconium or hafnium) and an aluminoxane. Polymers having a high molecular weight are obtained in a high yield.

4 Claims, No Drawings

PROCESS FOR THE PREPARATION OF A POLYOLEFIN

This application is a continuation of application Ser. No. 08/287,104 filed Aug. 8, 1994, now abandoned, which is a continuation of application Ser. No. 07/569,179 filed Aug. 17, 1990 now abandoned.

The invention relates to an olefin polymer of high molecular weight and low residual catalyst content.

Isotactic PP is prepared with the aid of ethylene-bis-(4,5,6,7)-tetrahydro-1-indenyl)-zirconium dichloride together with an aluminoxane in a suspension polymerization reaction (cf. EP-A-185,918). The polymer has a narrow molecular weight distribution ($M_w/M_n$ 1.6 to 2.6).

It has been possible to achieve a considerable increase in the activity of the catalyst system by a specific preactivation method (cf. DE-3,726,067). The particle morphology of the polymer has likewise been improved by this preactivation method.

The molecular weights of the polymers obtained in accordance with these two applications are still too low for industrial use.

There was thus the object of discovering a process for the preparation of a high molecular weight olefin polymer which can be carried out in an industrially interesting temperature range with a high catalyst activity.

It has been found that the object can be achieved by polymerization of olefins in the presence of certain metallocene catalysts.

The invention thus relates to a process for the preparation of a polyolefin by polymerization of an olefin of the formula $R^{11}$—CH=CH—$R^{12}$, in which $R^{11}$ and $R^{12}$ are identical or different and are a hydrogen atom or a $C_1$–$C_{14}$-alkyl radical, or $R^{11}$ and $R^{12}$, together with the carbon atom joining them, form a ring having 4 to 28 carbon atoms, at a temperature of 0° C. to 150° C., under a pressure of 0.5 to 100 bar, in solution, in suspension or in the gas phase and in the presence of a catalyst which consists of a metallocene and an aluminoxane of the formula (II)

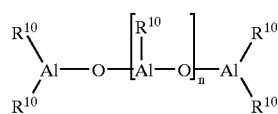

for the linear type, and/or of the formula (III)

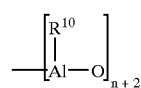

for the cyclic type, in which, in the formulae (II) and (III), $R^{10}$ is a $C_1$–$C_6$-alkyl group and n is an integer from 2 to 50, wherein the metallocene is at least one compound of the formula (I)

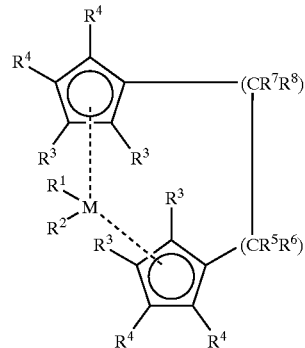

in which

M is zirconium or hafnium, $R^1$ and $R^2$ are identical or different and are a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group or a halogen atom, $R^3$ and $R^4$ are identical or different and are a hydrogen atom, a halogen atom, a $C_1$–$C_{10}$-alkyl group or a —$NR_2^9$, —$SR^9$, —$OR^9$, —$OSiR_3^9$, —$SiR_3^9$ or —$PR_2^9$ radical, in which $R^9$ is a $C_1$–$C_{10}$-alkyl group, a $C_6$–$C_{10}$-aryl group or, in the case of radicals containing Si or P, also a halogen atom, or in each case two adjacent radicals $R^3$ or $R^4$, together with the carbon atoms joining them, form a ring and $R^5$, $R^6$, $R^7$ and $R^8$ are identical or different and are a hydrogen atom, a halogen atom, a $C_1$–$C_{30}$-alkyl group, a $C_1$–$C_{10}$-fluoroalkyl group, a $C_6$–$C_{10}$-aryl group, a $C_6$–$C_{10}$-fluoroaryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group, a —$SiMe_3$ group, an —$OSiMe_3$ group or a $C_7$–$C_{40}$-alkylaryl group, or $R^5$ and $R^6$ or $R^7$ and $R^9$, in each case together with the atoms joining them, form a ring.

The catalyst to be used for the process according to the invention consists of an aluminoxane and at least one metallocene of the formula I

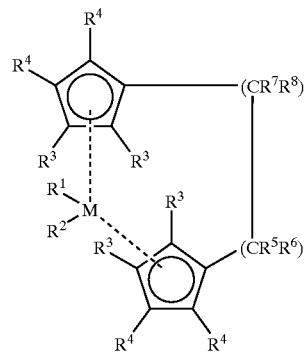

in which

M is hafnium or zirconium, preferably zirconium, $R^1$ and $R^2$ are identical or different and are a hydrogen atom, a $C_1$–$C_{10}$-, preferably $C_1$–$C_3$-alkyl group, a $C_1$–$C_{10}$-, preferably $C_1$–$C_3$-alkoxy group, a $C_6$–$C_{10}$-, preferably $C_6$–$C_8$-aryl group, a $C_6$–$C_1$1-, preferably $C_6$–$C_8$-aryloxy group, a $C_2$–$C_{10}$-, preferably $C_2$–$C_4$-alkenyl group, a $C_7$–$C_{40}$-, preferably $C_7$–$C_{10}$-arylalkyl group, a $C_7$–$C_{40}$-, preferably $C_7$–$C_{12}$-alkylaryl group, a $C_8$–$C_{40}$-, preferably $C_8$–$C_{12}$-arylalkenyl group or a halogen atom, preferably chlorine.

$R^3$ and $R^4$ are identical or different and are a hydrogen atom, a halogen atom, preferably a fluorine, chlorine or bromine atom, a $C_1$–$C_{10}$-, preferably $C_1$–$C_3$-alkyl group or a —$NR_2^9$, —$SR^9$, —$OR^9$, —$OSiR_3^9$, —$SiR_3^9$ or —$PR_2^9$ radical, in which $R^9$ is a $C_1$–$C_{10}$-, preferably $C_1$–$C_3$-alkyl group or $C_6$–$C_{10}$-, preferably $C_6$–$C_8$-aryl group, or in the case of radicals containing Si or P also a halogen atom, preferably a chlorine atom, or two adjacent radicals $R^3$ or $R^4$, together with the carbon atoms joining them, form a ring. Particularly preferred ligands are indenyl, fluorenyl and cyclopentadienyl.

$R^5$, $R^6$, $R^7$ and $R^8$ are identical or different and are a hydrogen atom, a halogen atom, a $C_1$–$C_{30}$-, preferably $C_1$–$C^4$-alkyl group, in particular a methyl group or ethyl group, a $C_1$–$C_{10}$-fluoroalkyl group, preferably a $CF_3$ group, a $C_6$–$C_{10}$-fluoroaryl group, preferably a pentafluorophenyl group, a $C_6$–$C_{19}$-, preferably $C_6$–$C_8$-aryl group, in particular —$CH_2$—$C_6H_5$ or —$C_6H_5$, a $C_1$–$C_{10}$-, preferably $C_1$–$C_4$-alkoxy group, in particular a methoxy group, a $C_2$–$C_{10}$-, preferably $C_2$–$C_4$-alkenyl group, a $C_7$–$C_{40}$-, preferably $C_7$–$C_{10}$-arylalkyl group, a $C_8$–$C_{40}$-, preferably $C_8$–$C_{12}$-arylalkenyl group or a $C_7$–$C_{40}$-, preferably $C_7$–$C_{12}$-alkylaryl group, or $R^5$ and $R^6$ or $R^7$ and $R^8$, in each case together with the atoms joining them, form a ring.

Especially preferably, $R^5$, $R^6$ and $R^7$ are a hydrogen atom and $R^8$ is a phenyl, benzyl, methyl, ethyl, trifluoromethyl or methoxy group, or $R^5$ and $R^7$ are a hydrogen atom and $R^6$ and $R^8$ are a phenyl, benzyl, ethyl, methyl, trifluoromethyl or methoxy group.

The metallocenes described above can be prepared in accordance with the following general equation:

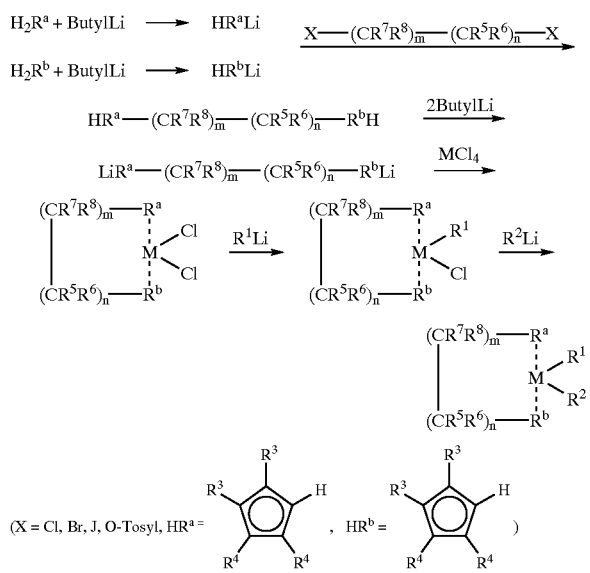

The cocatalyst is an aluminoxane of the formula II

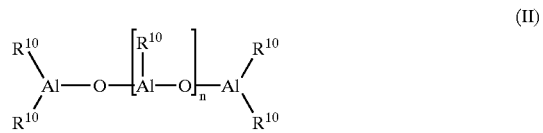

for the linear type, and/or of the formula (III)

for the cyclic type. In these formulae, $R^{10}$ is a $C_1$–$C_6$-alkyl group, preferably methyl, ethyl or isobutyl, in particular methyl, and n is an integer from 2 to 50, preferably 5 to 40. However, the exact structure of the aluminoxane is not known.

The aluminoxane can be prepared in various ways.

One possibility is careful addition of water to a dilute solution of an aluminum trialkyl by introducing the solution of the aluminum trialkyl, preferably aluminum trimethyl, and the water, in each case in small portions, into a larger amount of an inert solvent initially introduced into the vessel, and awaiting the end of the evolution of gas between each addition.

In another process, finely powdered copper sulfate pentahydrate is suspended in toluene and, in a glass flask under an inert gas at about −20° C., aluminum trialkyl is added in an amount so that about 1 mol of $CuSO_4.5H_2O$ is available for every 4 Al atoms. After slow hydrolysis, alkane being split off, the reaction mixture is left at room temperature for 24 to 48 hours, during which it must be cooled if appropriate, so that the temperature does not rise above 30° C. The aluminoxane dissolved in the toluene is then filtered off from the copper sulfate and the solution is concentrated in vacuo. It is assumed that in this preparation process the low molecular weight aluminoxanes condense to form higher oligomers, aluminum trialkyl being split off.

Aluminoxanes are furthermore obtained when aluminum trialkyl, preferably aluminum trimethyl, dissolved in an inert aliphatic or aromatic solvent, preferably heptane or toluene, is reacted with aluminum salts containing water of crystallization, preferably aluminum sulfate, at a temperature of −20 to 100° C. In this procedure, the volume ratio between the solvent and the aluminum trialkyl used is 1:1 to 50:1—preferably 5:1—and the reaction time, which can be monitored by the splitting off of the alkane, is 1 to 200 hours—preferably 10 to 40 hours.

Of the aluminum salts which contain water of crystallization, those which have a high content of water of crystallization are used in particular. Aluminum sulfate hydrate, especially the compounds $Al_2(SO_4)_3.16H_2O$ and $Al_2(SO_4)_3.18H_2O$ with the particularly high water of crystallization content of 16 and, respectively, 18 mol of $H_2O$/mol of $Al_2(SO_4)_3$, is particularly preferred.

Another variant for the preparation of aluminoxanes comprises dissolving an aluminum trialkyl, preferably aluminum trimethyl, in the suspending agent which has been initially introduced into the polymerization kettle, preferably in the liquid monomer or in heptane or toluene, and then reacting the aluminum compound with water.

In addition to the processes described above for the preparation of aluminoxanes, there are others which can be used.

Regardless of the nature of the preparation, all the aluminoxane solutions have a common feature of a varying content of unreacted aluminum trialkyl which is present in the free form or as an adduct.

It is possible to preactivate the metallocene with an aluminoxane of the formula (II) and/or (III) before use in the polymerization reaction. The polymerization activity is in this way significantly increased and the particle morphology is improved.

The preactivation of the transition metal compound is carried out in solution. Preferably, in this procedure, the metallocene is dissolved in a solution of the aluminoxane in an inert hydrocarbon. An aliphatic or aromatic hydrocarbon is suitable as the inert hydrocarbon. Toluene is preferably used. The concentration of the aluminoxane in the solution is in the range from about 1% by weight to the saturation limit, preferably 5 to 30% by weight, in each case based on the total solution. The metallocene can be used in the same concentration, but it is preferably used in an amount of $10^{-4}$—1 mol per mol of aluminoxane. The preactivation time is 5 minutes to 60 hours, preferably 5 to 60 minutes. The preactivation is carried out at a temperature of $-78°$ C. to $100°$ C., preferably 0 to $70°$ C.

The polymerization is carried out in a known manner in solution, in suspension or in the gas phase, continuously or discontinuously, in one or more stages at a temperature of 0 to $150°$ C., preferably 30 to $80°$ C. Olefins of the formula $R^{11}$—CH=CH—$R^{12}$ are polymerized. In this formula, $R^{11}$ and $R^{12}$ are identical or different and are a hydrogen atom or an alkyl radical having 1 to 28 carbon atoms. However, $R^{11}$ and $R^{12}$, together with the carbon atoms joining them, can also form a ring having 4 to 28 carbon atoms. Examples of such olefins are ethylene, propylene, 1-butene, 1-hexene, 4-methyl-1-pentene, 1-octene, norbornene, norbornadiene, pentene, hexene or octene. Propylene is polymerized in particular.

Hydrogen is added as a molecular weight regulator if necessary. The total pressure in the polymerization system is 0.5 to 100 bar. The polymerization is preferably carried out in the pressure range from 5 to 64 bar, which is of particular interest industrially.

The metallocene compound is used in the polymerization in a concentration, based on the transition metal, of $10^{-3}$ to $10^{-7}$, preferably $10^{-4}$ to $10^{-6}$ mol of transition metal per $dm^3$ of solvent or per $dm^3$ of reactor volume. The aluminoxane is used in a concentration of $10^{-5}$ to $10^{-1}$ mol, preferably $10^{-4}$ to $10^{-2}$ mol per $dm^3$ of solvent or per $dm^3$ of reactor volume. However, in principle higher concentrations are also possible. At least one compound of the formula I is used as the metallocene. Mixtures of several compounds of the formula I or mixtures of isomers are also possible.

If the polymerization is carried out as suspension or solution polymerization, an inert solvent which is customary for the Ziegler low pressure process is used. For example, the polymerization is carried out in an aliphatic or cycloaliphatic hydrocarbon; examples of these which may be mentioned are butane, pentane, hexane, heptane, isooctane, cyclohexane and methylcyclohexane.

A benzine or hydrogenated diesel oil fraction can furthermore be used. Toluene can also be used. The polymerization is preferably carried out in the liquid monomer.

If inert solvents are used, the monomers are metered in as a gas or in liquid form. If only one monomer is used as the suspending agent, the comonomer or the comonomers is or are metered in as a gas or in liquid form. It is furthermore possible to carry out the polymerization in a mixture of different monomers as the suspending agent; another monomer can then be metered in as a liquid or in gaseous form. If ethylene is used, it is advantageous for some of the ethylene to be initially introduced and for the remainder to be metered in during the polymerization.

The duration of the polymerization can be as desired, since the catalyst system to be used according to the invention shows only a slight time-related drop in polymerization activity.

The process according to the invention is distinguished by the fact that the metallocenes used are very heatstable, so that they can be used with high activity even at temperatures up to $90°$ C. The aluminoxanes used as cocatalysts can moreover be added in lower concentrations than previously. Finally, it. is now possible to prepare random copolymers at temperatures of industrial interest.

The metallocenes or metallocene mixtures to be used according to the invention contain compounds which can polymerize propylene to give polymers having a molecular weight of more than 150,000 g/mol, preferably 200,000 g/mol. This is confirmed by the molecular weight distribution, which has a high $M_w/M_n$ ratio (>2). The molecular weight distribution is sometimes multimodal.

Synthesis of 1,2-bis(1-indenyl)-1,2-bis(phenyl)Ethane (Diastereomer Mixture)

A mixture of 68.64 g (336 mmol) of methylphenyl-benzofulvene, 4.92 $cm^3$ (61 mmol) of $CCl_4$ and 100 $cm^3$ of tetrahydrofuran was added to 8.17 g (336 mmol) of magnesium filings in the course of 0.5 hour. The reaction mixture, which was warm because of the reaction which occurred, was then stirred overnight. The resulting Grignard mixture was added to ethereal HCl, and water was then added. The organic phase was separated off, dried over $Na_2SO_4$, filtered and evaporated.

The crude product was purified by column chromatography (50×250 mm; 60 Å, 70–200 μm, starting with pure n-hexane with an increasing $H_2CCl_2$ content).

Yield 3.1 g (7.55 mmol, 4.5%), $r_F$=0.26 (3 volumes of hexane/1 volume of $H_2CCl_2$), melting point 225–230° C.

EXAMPLE 1

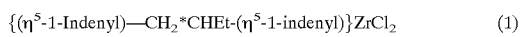

$\{(\eta^5\text{-1-Indenyl})\text{—CH}_2\text{*CHEt-}(\eta^5\text{-1-indenyl})\}ZrCl_2$ (1)

56 $cm^3$ of a 1.6 N (89.6 mmol) solution of butyllithium in hexane were added dropwise to 12.2 g (42.6 mmol) of the ligand (racemate) in 200 $cm^3$ of tetrahydrofuran at room temperature in the course of 1 hour and the mixture was stirred at $60°$ C. for 0.5 hour after the end of the evolution of butane.

The resulting dilithium salt solution was added dropwise, simultaneously with a solution of 16.6 g (44 mmol) of $ZrCl_4(tetrahydrofuran)_2$ in 300 $cm^3$ of tetrahydrofuran, to 50 $cm^3$ of tetrahydrofuran at room temperature in the course of 2 hours. The mixture was then stirred at room temperature for 1.5 hours, and 4 $cm^3$ of a 1.0 N (4 mmol) ethereal solution of HCl were added. After the dark reaction mixture had spontaneously brightened, an orange color persisted. The mixture was now concentrated to 200 $cm^3$ and the inorganic salts were precipitated by addition of toluene and filtered off.

The filtrate was concentrated further. When the volume was still 100 $cm^3$, a yellow-orange solid was obtained. To bring the precipitation to completion, the mixture was placed in a deep-freeze ($-35°$ C.) overnight and then filtered and the precipitate was washed with a little cold toluene and then with n-pentane and dried in vacuo. Yield I: 2.6 g (5.82 mmol=13.7%); NMR showed a 1:1 mixture of two complexes.

The precipitate which separates out on further concentration of the filtrate was treated as described above. Yield II; 3.3 g (7.39 mmol=17.4%); NMR showed a mixture of the complexes from I.

The filtrate was evaporated to dryness. Yield III: 0.2 g. Fraction II was taken up in ether and the mixture was concentrated slowly. The first precipitate A obtained showed an ~1:3 mixture according to NMR, the complex which appeared in the five-membered ring proton range in the higher field predominating. When the procedure was repeated with A, an enrichment to better than 1:4 was obtained (precipitate B, 1.2 g (2.69 mmol=6.3%). The filtrate of B evaporated to dryness contained the compound in resonance in the lower field enriched to more than 4:1 (yield 0.8 g (1.79 mmol=4.2%)). Fraction II showed a correct CH analysis: found 58.5 (calculated 59.18) % C; 4.6 (4.51)% H.

EXAMPLE 2

7.96 g (27.79 mmol) of ligand (racemate) in 100 cm$^3$ of tetrahydrofuran and 36 cm$^3$ of a 1.6 N (57.6 mmol) solution of butyllithium in hexane were reacted as described in Example 1 to give the dilithium salt. 10.78 g (28.58 mmol) of ZrCl$_4$ (tetrahydrofuran)$_2$ in 200 cm$^3$ of tetrahydrofuran and the dilithium salt solution were added dropwise to 50 cm$^3$ of tetrahydrofuran at room temperature. The procedure followed here was such that a larger amount of zirconium compound was always initially introduced, i.e. the zirconium solution was added in the course of 3 hours and the dilithium salt solution was added in the course of 8.5 hours. After the mixture had been stirred at room temperature for two hours, 2.5 cm$^3$ of 1.0 N (2.5 mmol) ethereal HCl were added—the mixture brightened immediately—and the mixture was concentrated to about 100 cm$^3$. 150 cm$^3$ of toluene were then added and the mixture was left to stand overnight. The precipitate obtained was separated off and the filtrate was concentrated. A small amount of oil which occurred during this operation was decanted off and the liquid was evaporated to dryness. The crude product was analyzed by NMR spectroscopy. The species known from Example 1 was found as the main component, together with at least one other compound. The mixture was extracted with 2×120 cm$^3$ of Et$_2$O and the filtrate was evaporated. Its NMR spectrum shows, in addition to the signals known from Example 1, further resonances in the five-membered ring proton range. The further ether extracts obtained (Σ 1 cm$^3$) were evaporated to dryness. 10.5 g of yellow solid were obtained (23.5 mmol=84.6%; NMR: two complexes).

EXAMPLE 3

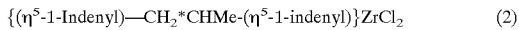

$$\{(\eta^5\text{-1-Indenyl})\text{—}CH_2\text{*}CHMe\text{-}(\eta^5\text{-1-indenyl})\}ZrCl_2 \quad (2)$$

41 cm$^3$ of a 1.6 N (65.6 mmol) solution of butyllithium in hexane were added dropwise to 7.7 g (30.53 mmol) of ligand (racemate) in 100 cm$^3$ of tetrahydrofuran at room temperature in the course of 1 hour and the mixture was stirred at 60° C. for 0.5 hour after the evolution of butane had ended.

11.7 g (31.01 mmol) of ZrCl$_4$(tetrahydrofuran)$_2$ in 250 cm$^3$ of tetrahydrofuran were added, simultaneously with the dilithium salt solution, to 50 cm$^3$ of tetrahydrofuran at room temperature in the course of 5 hours. After the mixture had been stirred at room temperature for two days, 4 cm$^3$ (4 mmol) of ethereal HCl were added. The now clear yellow-orange reaction mixture was concentrated to dryness. The orange-red evaporation residue was extracted with 6×80 cm$^3$ of toluene and the mixture was filtered and concentrated. An oil which was obtained during concentration to 200 cm$^3$ was decanted off and the filtrate was concentrated further to 80 cm$^3$. The precipitate A obtained by this procedure was filtered off, washed with a little n-pentane and dried in vacuo. Yield A: 1.85 g (4.28 mmol=14%); NMR shows two complexes.

The filtrate was concentrated further to 30 cm$^3$ and placed at a low temperature (−35° C.) overnight, decanted off from precipitate B and evaporated to dryness (0.1 g; NMR showed starting materials i.e. ligand and ZrCl$_4$ (tetrahydrofuran)$_2$, toluene and probably four complexes). Precipitate B was washed with pentane and dried in vacuo. Yield B: 0.7 g (1.62 mmol=5.3%); NMR showed the presence of a four-component mixture.

Elemental analysis gave the following result: found 57.9% (calculated 58.32) C, 4.2% (4.4) H.

EXAMPLE 4

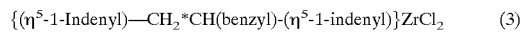

$$\{(\eta^5\text{-1-Indenyl})\text{—}CH_2\text{*}CH(benzyl)\text{-}(\eta^5\text{-1-indenyl})\}ZrCl_2 \quad (3)$$

17.25 cm$^3$ of a 1.6 N (27.6 mmol) solution of butyllithium in hexane were added dropwise to 4.53 g (13 mmol) of ligand in 75 cm$^3$ of tetrahydrofuran and the mixture was then stirred at 55° C. for 0.5 hour after the evolution of gas had ended.

This dilithium salt solution was added, simultaneously with 4.9 g (12.99 mmol) of ZrCl$_4$(tetrahydrofuran)$_2$ in 100 cm$^3$ of tetrahydrofuran, to 30 cm$^3$ of tetrahydrofuran at room temperature in the course of 6 hours, the mixture was evaporated to dryness, the residue was taken up in toluene and the mixture was filtered. After the solvent had been stripped off, the residue was digested several times with n-pentane, the pentane being decanted off. The residue now obtained was dried. Yield: 2.28 g (about 4.47 mmol=34.4%); NMR confirmed the presence of at least three complexes, contaminated with tetrahydrofuran and pentane.

EXAMPLE 5

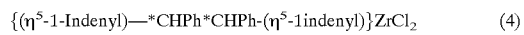

$$\{(\eta^5\text{-1-Indenyl})\text{—*}CHPh\text{*}CHPh\text{-}(\eta^5\text{-1indenyl})\}ZrCl_2 \quad (4)$$

6.25 cm$^3$ of a 1.6 N (10 mmol) solution of butyllithium in hexane were added dropwise to 2.04 g (4.97 mmol) of ligand (diastereomer mixture) in 40 cm$^3$ of tetrahydrofuran at room temperature. During this procedure, a white-green precipitate separated out after about half the solution had been added. After the mixture had been stirred at 60° C. for two hours, the dilithium salt obtained was added in portions to 1.88 g (4.98 mmol) of ZrCl$_4$(tetrahydrofuran)$_2$, dissolved in 40 cm$^3$ of tetrahydrofuran, at 0° C. Thereafter, the mixture was stirred at room temperature for 4 hours and concentrated to dryness, the residue was extracted with a warm (about 40° C.) n-pentane/toluene mixture (2:1 by volume), the mixture was filtered and the clear yellow solution obtained was concentrated. A yellow precipitate A obtained by this procedure was filtered off, washed with a little cold Et$_2$O and dried in vacuo. Yield A: 0.45 g (about 0.86 mmol=17.7%); NMR showed, in addition to solvents (Et$_2$O, tetrahydrofuran, n-pentane, toluene), signals having cleavage patterns of at least two complex compounds, which patterns are characteristic of indenyl complex five-membered ring protons. 25 cm$^3$ of n-pentane were added to the filtrate and precipitate B which had separated out was filtered off, washed with a little cold Et$_2$O and dried in vacuo. Yield B: 1.08 g (1.57 mmol=31.5%); NMR showed, in addition to the signals of toluene and pentane, the probable presence of a single complex species which was not present in A.

The filtrate of B was evaporated to dryness. Its NMR showed, in addition to Et$_2$O, pentane and toluene, probably signals of the complex from precipitate B and the ligand.

EXAMPLE 6

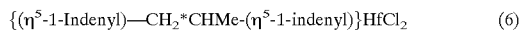
$\{(\eta^5\text{-1-Indenyl})\text{—CH}_2{}^*\text{CHMe-}(\eta^5\text{-1-indenyl})\}\text{HfCl}_2$ (6)

34 cm$^3$ of a 1.6 N (54.4 mmol) solution of butyllithium in hexane were added dropwise to 7.2 g (26.95 mmol) of ligand (racemate) in 200 cm$^3$ of tetrahydrofuran at room temperature in the course of one hour and the mixture was then stirred at 60° C. for 1 hour. The dilithium salt was then added dropwise, simultaneously together with 13 g (28 mmol) of HfCl4(tetrahydrofuran)$_2$ in 200 cm$^3$ of tetrahydrofuran, to 50 cm$^3$ of tetrahydrofuran, the procedure being such that an Hf excess was present in the reactor vessel. After ⅔ of the reaction partners had been added, the mixture was left to stand overnight and the remainder of the reaction partners was added in the course of 4 hours. The mixture was then stirred overnight and 4 cm$^3$ of 1.0 N (4.0 mmol) ethereal HCl were added, a brightening in color being observed.

The yellow-brown evaporation residue was extracted with toluene and the mixture was filtered and evaporated to dryness. The resulting residue I was digested with n-pentane, the filtered solvent was stripped off and the remainder of about 25 cm$^3$ was separated off from the precipitate obtained.

Yield A: 0.61 g (1.14 mmol=4.2%); NMR showed, in addition to the signals of the ligand, resonances in the indenyl five-membered ring proton range, which demonstrate the presence of three complex compounds, two being present as main components.

Residue I was further extracted with pentane/Et$_2$O (1:2 by volume), the mixture was filtered and the filtrate was concentrated. Yield B: 0.26 g (0.49 mmol=1.8%); NMR demonstrated the presence of a complex mixture, evidently of four compounds (four methyl group triplets of the ethyl group in the range from 1.25 to 0.85 ppm).

The following elemental analysis was found: calculated 49.5 (found 50.9) % C; 3.78 (4.1)% H.

EXAMPLE 7

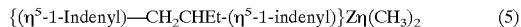
$\{(\eta^5\text{-1-Indenyl})\text{—CH}_2\text{CHEt-}(\eta^5\text{-1-indenyl})\}\text{Zn(CH}_3)_2$ (5)

4.1 cm$^3$ of a 1.6 N (6.56 mmol) solution of methyllithium in ether were added dropwise to 1.45 g (3.25 mmol) of a suspension of two complex compounds in 50 cm$^3$ of Et$_2$O at −40° C. When a relatively large proportion of the components had dissolved and a dirty white precipitate had formed, the mixture was evaporated to dryness. After extraction with 200 cm$^3$ of n-pentane and filtration, the solvent was stripped off and the residue was dried in vacuo.

Yield: 1.15 g (about 2.83 mmol=87.0%); NMR showed, in addition to a few impurities, probably monomethylated compounds, two main components with the resonances typical of CH$_3$Zr species in the high field range, i.e. as expected two resonances for the syn-form, at −0.76 and −0.88 ppm, and two signals at an almost identical shift of −1.02 ppm for the anti-form, which no longer has C$_2$ symmetry because of the unsymmetric C$_2$ bridge.

EXAMPLES 7 TO 10 AND COMPARISON EXAMPLE A

A dry 16 dm$^3$ kettle was flushed with nitrogen and filled with 10 dm$^3$ of a benzine (boiling range 100–120° C.) at 20° C. The gas space in the kettle was then flushed free from nitrogen by forcing in 2 bar of ethylene and letting down 5 times. Thereafter, 30 cm$^3$ of a toluene solution of methylaluminoxane (10.5% by weight of methylaluminoxane, molecular weight according to cryoscopic determination: 750 g/mol) were added. The contents of the kettle were heated up to 60° C. in the course of 15 minutes, while stirring. The total pressure was then adjusted to 5 bar by feeding in ethylene, while stirring at 250 revolutions per minute. In parallel with this, 3.1 mg of metallocene were dissolved in 20 cm$^3$ of a toluene solution of methylaluminoxane (concentration and quality as above) and were preactivated by being left to stand for 15 minutes. The solution was then introduced into the kettle. The polymerization system was brought to a temperature of 65° C. and then kept at this temperature for 1 hour by appropriate cooling. During this period, the total pressure was kept at 5 bar by appropriately feeding in ethylene. The amounts shown in Table 1 were obtained.

The following abbreviations have been used in the tables:
VN=viscosity number in cm$^3$/g,
Mw=weight-average molecular weight in g/mol
Mw/Mn=polydispersity determined by gel permeation chromatography (GPC)
II=isotaxy, determined by $^{13}$C-NMR spectroscopy,
BD=bulk density, T$_g$=glass transition temperature.

EXAMPLES 11 AND 12 AND COMPARISON EXAMPLE B

A clean, dry 1.5 dm$^3$ polymerization reactor with a stirrer was flushed with nitrogen and then with ethylene and filled with a solution of norbornene in 750 cm$^3$ of toluene. The reactor was then brought to a temperature of 20° C., while stirring, and 1 bar of ethylene was forced in. 20 cm$^3$ of a toluene solution of methylaluminoxane (10.1% by weight of methylaluminoxane of molecular weight 1300 g/mol, cryoscopic determination) were then metered into the reactor and the mixture was stirred at 20° C. for 15 minutes, the ethylene pressure being kept at 1 bar by topping up (saturation of the toluene with ethylene). In parallel with this, the metallocene was dissolved in 10 cm$^3$ of a toluene solution of methylaluminoxane (concentration and quality see above) and was preactivated by being left to stand for 15 minutes. The solution of the complex was then metered into the reactor. Polymerization was subsequently carried out at 20° C. for 1 hour, while stirring (750 revolutions per minute), the ethylene pressure being kept under 1 bar by topping up. The contents of the reactor were then drained rapidly into a stirred vessel into which 100 cm$^3$ of isopropanol had been initially introduced. 2 dm$^3$ of acetone were added to this mixture, the mixture was stirred for 10 minutes and the suspended polymeric solid was then filtered off. The polymer filtered off was then added to 600 cm$^3$ of a mixture of two parts of 3 normal hydrochloric acid and one part of ethanol and this suspension was stirred for 2 hours. The polymer was then filtered off again, washed neutral with water and dried at 80° C. under 0.2 bar for 15 hours.

The results of the experiments are summarized in Table 2.

EXAMPLES 13 to 15 AND COMPARISON EXAMPLE C

A clean, dry 1.5 dm$^3$ polymerization reactor with a stirrer was flushed with nitrogen and then with propylene and filled with a solution of 30 g of norbornene in 750 cm³ of toluene. The reactor was then brought to a temperature of 20° C., while stirring, and 1 bar of propylene was forced in. 20 cm³ of a toluene solution of methylaluminoxane (10.1% by weight of methylaluminoxane having a molecular weight of 1300 g/mol) were then metered into the reactor and the mixture was stirred at 20° C. for 15 minutes, the propylene pressure being kept at 1 bar by topping up (saturation of the toluene with propylene). In parallel with this the metallocene was dissolved in 10 cm³ of a toluene solution of methylaluminoxane (concentration and quality see above) and preactivated by being left to stand for 15 minutes. The solution of the complex was then metered into the reactor. Polymerization was subsequently carried out at 20° C. for 3 hours, while stirring (750 revolutions per minute), the propylene pressure being kept at 1 bar by topping up. The contents of the reactor were then drained rapidly into a stirred vessel into which 100 cm³ of isopropanol had been initially introduced. 2 dm³ of acetone were added to this mixture, the mixture was stirred for 30 minutes and the suspended polymeric solid was filtered off. The polymer filtered off was then added to 600 cm³ of a mixture of two parts of 3 normal hydrochloric acid and one part of ethanol and this suspension was stirred for 2 hours. 200 cm³ of toluene were then added to the mixture and, after the mixture had been stirred for a further 5 minutes, the toluene phase was separated off and 1 dm³ of acetone was added. The polymer which had been dissolved in toluene by extraction of the hydrochloric acid mixture was precipitated during this procedure. The polymeric solid precipitated was filtered off and dried at 80° C. under 0.2 bar for 15 hours. The experimental results are summarized in Table 3.

EXAMPLES 16 TO 47

A dry 16 dm³ kettle was flushed with nitrogen and then filled with 10 dm³ of liquid propylene. Two thirds of the amount of methylaluminoxane stated in Table 4 for the particular experiment were then added as a solution in toluene and the mixture was stirred at 30° C. for 15 minutes. In parallel with this a solution of the metallocene in one third of the amount of methylaluminoxane stated in Table 4 was prepared and was preactivated by being left to stand for 15 minutes. The metallocene (Examples 1 to 7) were used as mixtures of compounds or as isomer mixtures, without further purification.

This solution was then introduced into the kettle. The polymerization system was brought to the appropriate polymerization temperature and the polymerization was started. After 60 minutes, the polymerization was stopped by cooling the reactor and letting down. The resulting polymer yield and the analytical data determined can be seen from Table 4.

TABLE 1

| Example | Metallocene | Amount of catalyst weighted out (mg) | Yield of PE (g) | BD (g/cm³) | VN (cm³/g) | $M_w$ ($10^3$ g/mol) | $M_w/M_n$ |
|---|---|---|---|---|---|---|---|
| A (Comparison) | racemic ethylene-bis-(1-indenyl)zirconium dichloride | 4.2 | 430 | 120 | 220 | 160 | 3.1 |
| 7 | racemic methylethylene-bis-(1-indenyl)zirconium dichloride | 5.3 | 250 | 50 | 390 | | |
| 8 | racemic ethylethylene-bis-(1-indenyl)zirconium dichloride | 5.1 | 290 | 130 | 290 | | |
| 9 | racemic 1,2-diphenyl-ethylene-bis-(1-indenyl)-zirconium dichloride | 9.6 | 50 | 80 | 510 | | |
| 10 | racemic 1,2-diphenyl-ethylene-bis-(1-indenyl)-zirconium dichloride (individual isomer) | 10.1 | 60 | 150 | 320 | | |

TABLE 2

| Example | Metallocene | Amount of catalyst weighted out (mg) | Amount of norbornene used (g) | Yield (g) | VN (cm³/g) | Tg (° C.) |
|---|---|---|---|---|---|---|
| B (Comparison) | Zr(ind)₂EtCl₂ | 10.2 | 50 | 20 | 260 | 65.3 |
| 11 | Zr(ind)₂Et*EtCl₂ | 6.0 | 50 | 30 | 164 | 67.5 |
| 12 | Zr(ind)₂Et*MeCl₂ | 4.0 | 60 | 5.5 | 180 | 71.7 |

TABLE 3

| Example | Metallocene | Amount of catalyst weighted out (mg) | Amount of norbornene used (g) | Yield (g) | VN (cm³/g) | Tg (° C.) |
|---|---|---|---|---|---|---|
| C (Comparison) | Zr(ind)$_2$EtCl$_2$ | 30.2 | 30 | 5.5 | 25 | 93.4 |
| 13 | Zr(ind)$_2$Et*EtCl$_2$ | 29.9 | 30 | 28.0 | 23 | 101.0 |
| 14 | Zr(ind)$_2$Et*MeCl$_2$ | 30.1 | 30 | 23 | 25 | 99.0 |
| 15 | Zr(ind)$_2$Et*Ph$_2$Cl$_2$ | 120.4 | 30 | 0.2 | 18 | 79.7 |

TABLE 4

| Example | Metallocene | Catalyst | Temperature ° C. | Amount of catalyst (mg) | Yield (g) | Activity (kg g of PP/g of cat./h) | MAO (mmol of Al) | Bulk density (g/cm³) | VN (cm³/g) | Mw (g/mmol) | $M_w/M_n$ |
|---|---|---|---|---|---|---|---|---|---|---|---|
| 16 | Zr(Ind)$_2$C$_2$EtMe$_2$ | 5 | 70 | 10.0 | 1764 | 176.4 | 74 | 420 | 53 | 55 000 | 4.4 |
| 17 | Zr(Ind)$_2$EtMeCl$_2$ | 2 | 70 | 10.8 | 1718 | 159.1 | 74 | | 60 | 48 000 | 3.6 |
| 18 | | | 60 | 15.0 | 1750 | 116.7 | 74 | | 64 | 62 000 | 3.6 |
| 19 | | | 50 | 13.3 | 887 | 66.7 | 74 | | 0 | 77 000 | 4.6 |
| 20 | | | 40 | 22.4 | 347 | 15.5 | 74 | | 0 | 81 000 | 4.3 |
| 21 | Zr(Ind)$_2$Et*EtCl$_2$ | 1a | 70 | 16.0 | 2154 | 134.6 | 80 | | 0 | 28 000 | 4.8 |
| 22 | | | 60 | 16.0 | 1717 | 107.3 | 80 | | 0 | 22 500 | 3.5 |
| 23 | | | 50 | 15.0 | 636 | 42.4 | 80 | 268 | 42 | 37 000 | 4.9 |
| 24 | | | 40 | 28.0 | 291 | 10.4 | 72 | | 0 | 71 000 | 2.7 |
| 25 | Zr(Ind)$_2$Et*EtCl$_2$ | 1b | 40 | 50.0 | 1085 | 21.7 | 80 | | 76 | 88 500 | 5.4 |
| 26 | | | 50 | 36.5 | 1212 | 33.2 | 80 | 172 | 70 | 69 000 | 5.8 |
| 27 | | | 60 | 15.0 | 672 | 44.8 | 80 | 265 | 53 | 55 000 | 4.2 |
| 28 | | | 70 | 15.0 | 995 | 66.3 | 80 | 381 | 53 | 51 000 | 4.0 |
| 29 | Zr(Ind)$_2$Et*EtCl$_2$ | 1c | 40 | 15.0 | 563 | 37.5 | 80 | 120 | 142 | 163 000 | 4.2 |
| 30 | | | 50 | 20.0 | 1280 | 64.0 | 80 | 100 | 96 | 106 500 | 3.6 |
| 31 | | | 60 | 15.5 | 1049 | 67.7 | 80 | 185 | 78 | 77 500 | 3.6 |
| 32 | | | 70 | 23.3 | 2649 | 113.7 | 80 | 530 | 63 | 53 500 | 2.8 |
| 33 | Zr(Ind)$_2$Et*EtCl$_2$ | 1d | 40 | 30.0 | 1659 | 55.3 | 80 | 200 | 47 | 36 000 | 4.4 |
| 34 | | | 50 | 20.5 | 1960 | 95.6 | 80 | 335 | 47 | 38 000 | 5.3 |
| 35 | | | 60 | 20.0 | 2450 | 122.5 | 80 | 470 | 52 | 49 000 | 5.5 |
| 36 | Zr(Ind)$_2$Et*CH$_2$PhCl$_2$ | 3 | 40 | 60.0 | 162 | 2.7 | 74 | 106 | 90 | 86 000 | 8.9 |
| 37 | | | 50 | 50.0 | 300 | 6.0 | 74 | 90 | 102 | 86 000 | 4.8 |
| 38 | | | 60 | 50.0 | 480 | 9.6 | 74 | 204 | 75 | 66 000 | 6.6 |
| 39 | | | 70 | 50.0 | 810 | 16.2 | 74 | 334 | 67 | 49 000 | 6.9 |
| 40 | Zr(Ind)$_2$Et*(Ph)$_2$Cl$_2$ | 4a | 40 | 35.0 | 256 | 7.3 | 80 | | | | |
| 41 | | | 50 | 15.0 | 300 | 20.0 | 80 | 424 | 84 | 70 000 | 2.4 |
| 42 | | | 60 | 15.0 | 474 | 31.6 | 80 | | 65 | 49 000 | 2.4 |
| 43 | | | 70 | 18.0 | 961 | 53.4 | 80 | 275 | | | |
| 44 | Zr(Ind)$_2$Et*(Ph)$_2$Cl$_2$ | 4b | 40 | 50.0 | 90 | 1.8 | 74 | 140 | 94 | 60 000 | 2.6 |
| 45 | | | 50 | 50.0 | 115 | 2.3 | 74 | 140 | 68 | 60 000 | 2.9 |
| 46 | | | 60 | 50.0 | 250 | 5.0 | 74 | | 65 | 70 000 | 2.4 |
| 47 | | | 70 | 50.0 | 420 | 8.4 | 74 | 176 | 59 | 49 000 | 3.5 |

What is claimed is:

1. A process for the preparation of a polyolefin by polymerization of an olefin of the formula $R^{11}$—CH=CH—$R^{12}$, in which $R^{11}$ and $R^{12}$ are identical or different and are a hydrogen atom or a $C_1$–$C_{14}$-alkyl radical, at a temperature of 0° C. to 150° C., under a pressure of 0.5 to 100 bar, in solution, in suspension or in the gas phase and in the present of a catalyst which consists essentially of a metallocene and an aluminoxane of the formula (II)

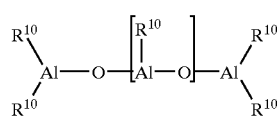

for the linear type, and/or of the formula (III)

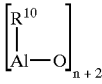

for the cyclic type, in which, in the formulae (II) and (III), $R^{10}$ is a $C_1$–$C_6$-alkyl group and n is an integer from 2 to 50, wherein the metallocene is wherein said metallocene is ethyl-ethylene(indenyl)$_2$ zirconium dichloride.

2. The process as claimed in claim 1, wherein said aluminoxane is methyl aluminoxane.

3. A process for the preparation of a polyolefin by polymerization of an olefin of the formula $R^{11}$—CH=CH—$R^{12}$, in which $R^{11}$ and $R^{12}$ are identical or different and are a hydrogen atom or a $C_1$–$C_{14}$-alkyl radical, at a tenperature of 0° C. to 150° C., under a pressure of 0.5 to 100 bar, in solution, in suspension or in the gas phase and in the presence of a catalyst which consists essentially of a metallocene and an aluminoxane of the formula (II)

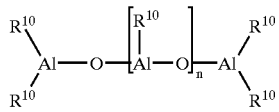
(II)

for the linear type, and/or of the formula (III)

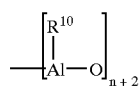
(III)

for the cyclic type, in which, in the formulae (II) and (III), $R^{10}$ is a $C_1$–$C_6$-alkyl group and n is an integer from 2 to 50, wherein said metallocene is racemic 1,2-diphenyl-ethylene-bis(1-indenyl)zirconium dichloride.

4. The process as claimed in claim 3, wherein said aluminoxane is methyl aluminoxane.

* * * * *